(12) United States Patent
Peterson

(10) Patent No.: US 10,146,465 B1
(45) Date of Patent: Dec. 4, 2018

(54) AUTOMATED PROVISIONING AND DE-PROVISIONING SOFTWARE DEFINED STORAGE SYSTEMS

(71) Applicant: EMC Corporation, Hopkinton, MA (US)

(72) Inventor: Ryan Peterson, Discovery Bay, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 226 days.

(21) Appl. No.: 14/974,157

(22) Filed: Dec. 18, 2015

(51) Int. Cl.
*G06F 3/06* (2006.01)

(52) U.S. Cl.
CPC .......... *G06F 3/0629* (2013.01); *G06F 3/0607* (2013.01); *G06F 3/0683* (2013.01)

(58) Field of Classification Search
CPC ..... G06F 3/0629; G06F 3/0607; G06F 3/0683
USPC .......................................................... 710/74
See application file for complete search history.

(56) References Cited

U.S. PATENT DOCUMENTS

| | | | | |
|---|---|---|---|---|
| 5,651,133 A * | 7/1997 | Burkes | ................ | G06F 11/1076 711/114 |
| 8,539,194 B2 * | 9/2013 | Inoue | .................... | G06F 3/0605 711/171 |
| 9,176,858 B2 * | 11/2015 | Jin | ........................ | G06F 3/0608 |
| 9,552,259 B1 * | 1/2017 | Chopra | ............... | G06F 11/1461 |
| 9,794,139 B2 * | 10/2017 | Bragstad | ................ | H04L 43/04 |
| 2007/0168634 A1 * | 7/2007 | Morishita | ............ | G06F 3/0608 711/170 |
| 2008/0162839 A1 * | 7/2008 | Nakamichi | ........... | G06F 3/0607 711/159 |
| 2011/0276963 A1 * | 11/2011 | Wu | ..................... | H04L 67/1097 718/1 |
| 2012/0102291 A1 * | 4/2012 | Cherian | ............... | G06F 9/5044 711/170 |
| 2013/0212349 A1 * | 8/2013 | Maruyama | ............. | G06F 12/00 711/167 |
| 2013/0219144 A1 * | 8/2013 | Oe | ......................... | G06F 12/02 711/165 |
| 2013/0232297 A1 * | 9/2013 | Tanaka | ................ | G06F 12/0246 711/103 |
| 2013/0275381 A1 * | 10/2013 | De Schrijvr | ........ | G06F 11/1076 707/652 |
| 2014/0122677 A1 * | 5/2014 | Hasegawa | ............. | G06F 21/105 709/223 |
| 2014/0207944 A1 * | 7/2014 | Emaru | .................... | H04L 47/78 709/224 |
| 2014/0223240 A1 * | 8/2014 | Patil | .................... | G06F 11/3034 714/47.1 |
| 2015/0153959 A1 * | 6/2015 | Esaka | ................... | G06F 3/0619 711/114 |
| 2015/0317556 A1 * | 11/2015 | Huang | ................... | H04L 29/08 706/23 |
| 2016/0004476 A1 * | 1/2016 | Emaru | ............... | G06F 9/45558 710/74 |

(Continued)

*Primary Examiner* — Paul R. Myers
(74) *Attorney, Agent, or Firm* — Workman Nydegger

(57) ABSTRACT

Systems and methods for automatically provisioning and de-provisioning software defined storage (SDS) systems. Characteristics such as IPOS, capacity, and throughput of the SDS systems are monitored. Capacity or storage is added or removed from the SDS systems based on the relationships between the characteristics of the SDS systems with respect to upper and lower thresholds.

16 Claims, 4 Drawing Sheets

(56) References Cited

U.S. PATENT DOCUMENTS

2016/0301610 A1* 10/2016 Amit .................. H04L 67/1097
2017/0078164 A1* 3/2017 Hildebrand ............. H04L 43/04
2017/0078165 A1* 3/2017 Hildebrand ............. H04L 45/04

* cited by examiner

AUTOMATED PROVISIONING AND DE-PROVISIONING SOFTWARE DEFINED STORAGE SYSTEMS

FIELD OF THE INVENTION

Embodiments of the invention relate to software defined storage (SDS) systems. More particularly, embodiments of the invention relate to systems and methods for provisioning and de-provisioning nodes of an SDS system in an automated manner.

BACKGROUND

Software defined storage (SDS) systems provide a storage infrastructure that is managed by software. SDS also systems come in a variety of configurations and can be deployed in different environments. SDS systems can be implemented for direct attached storage (DAS) devices, cloud-based storage, network attached storage (NAS), or the like. Examples of SDS systems include, but are not limited to, EMC Elastic Cloud Storage (ECS), EMC SCALEIO, and EMC ISILON. Each of these systems may be implemented in different computing environments and each has a different approach to storing data.

SDS systems provide scalable storage for structured and unstructured data and can be optimized to take advantage of hardware efficiencies. SDS systems for cloud-based storage (whether public or private) may be configured differently from SDS systems for NAS storage or DAS storage. SDS systems and/or the associated storage can also be virtualized.

Notwithstanding these advantages, SDS systems can still be improved. For example, when new or additional storage is required in an SDS system, the storage is manually added to the SDS system. Additional storage is added manually because the nature of each storage system is often unique. SDS systems, for example, may be block based, file based, or object based. Thus, in order to add resources to an SDS system, it is necessary to know that there is a capacity problem, understand the type of storage needed, and manually provision the the new capacity. The manual nature of this task may prevent sufficient new resources from being allocated and require the process to be repeated. In addition, the manual addition of capacity may not account for capacity that can be released and re-provisioned. This can lead to situations where an entity bears the cost of too much storage. Systems and methods are needed to improve the performance of SDS systems and to automatically add or remove capacity in a distributed storage or hyperconverged environment.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention relate to software defined storage (SDS) systems. Embodiments of the invention further relate to automatically provisioning and de-provisioning SDS systems. Stated differently, embodiments of the invention relate to systems and methods for automatically adding or removing storage from an SDS system.

In one example, SDS systems have characteristics that include, but are not limited to, capacity, IOPS (Input/Output operations per second), throughput, latency, and the like. In one example, capacity refers to an amount of storage managed by the SDS system, IOPS refers to the number of input/output operations performed per second, latency refers to the amount of time required to start an IO task, and throughput refers to the speed at which data is transferred out of or into the SDS system.

Embodiments of the invention monitor these characteristics and when these characteristics pass certain threshold levels, nodes (and thus capacity) can be added to or removed from the SDS systems. In one example, the decision to add or remove capacity (e.g., by adding or removing a node) from an SDS system can be based on one or more of these characteristics. For example, a node may be added to an SDS system when any one or more of the characteristics surpass specified or pre-determined thresholds. A node may be removed from an SDS system when any one or more of the characteristics fall below a specified or pre-determined threshold. The thresholds can be set by an end user or pre-determined. Embodiments of the invention may treat all characteristics equally, give priority or higher weight to certain characteristics, rely on specific sub-groups of characteristics, or the like. In addition, the thresholds can be adjusted. By automatically provisioning and de-provisioning nodes of SDS systems, the ability to manage capacity or storage is improved and storage is used more effectively.

In some computing environments, multiple SDS systems operate simultaneously. Embodiments of the invention automatically provision and de-provision nodes associated with each of the SDS systems based on the characteristics of the SDS systems.

A typical SDS system may include server nodes, which may each be mounted on a rack. The nodes of each SDS system in a computing environment may also be organized as a cluster and provide the benefits of cluster architecture. The server nodes are each associated with storage or memory of some type. Some nodes may have higher performance storage than other nodes. In addition to managing storage in general, embodiments of the invention can also use these characteristics to monitor different tiers of storage. The characteristics discussed herein can be applied to storage as a whole and/or to different tiers of storage. Thus, in addition to adding capacity, specific types of storage may be added as necessary.

Figure 1:
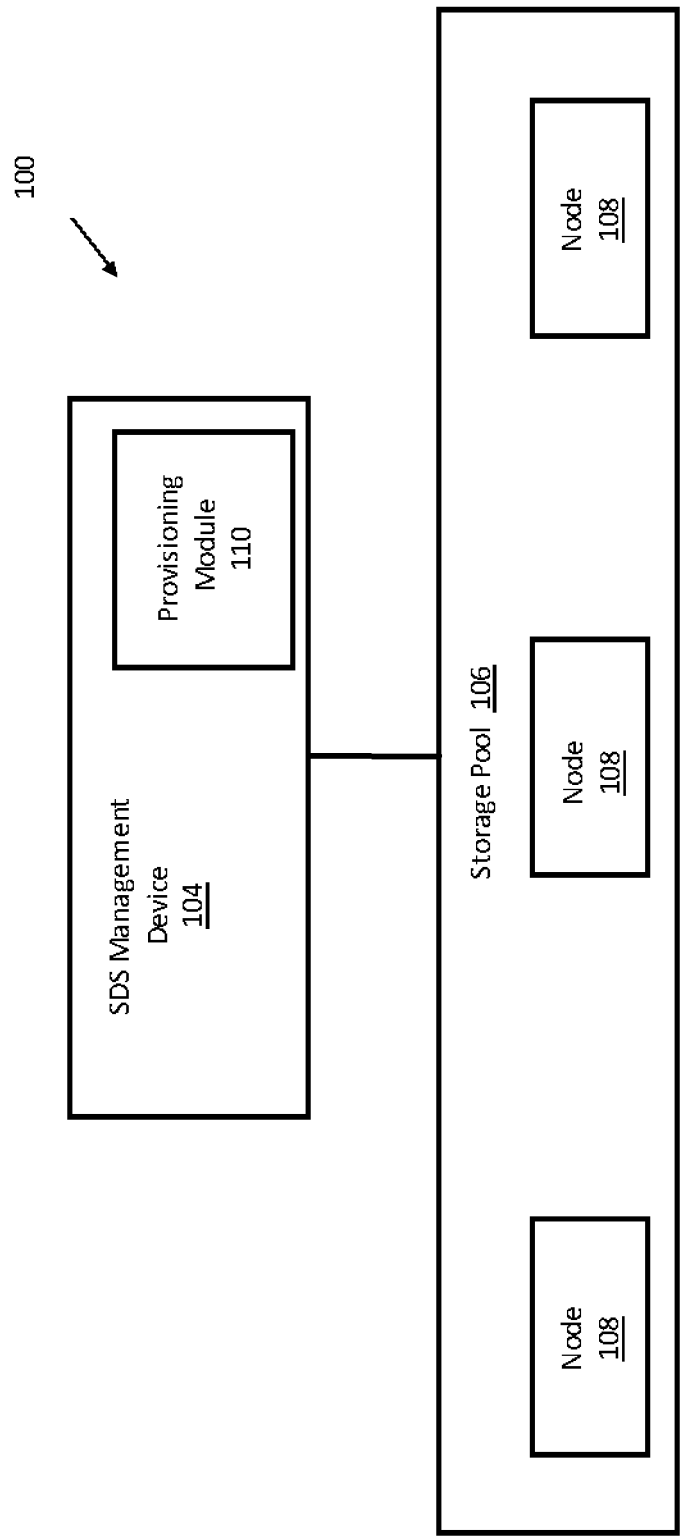
FIG. 1 illustrates an example of an SDS system that can be automatically provisioned and de-provisioned.

FIG. 1 illustrates an example of an SDS system in a computing environment 100. The SDS system may include an SDS management device 104 and a storage pool 106. The SDS management device 104 may include software that may be implemented on one or more of the nodes of the SDS system. The SDS management device 104 may be a dedicated appliance or server and an SDS system may have more than one management device. Each SDS system may be associated with an SDS management device 104.

The SDS management device 104 may be accessible over the Internet, over a local network, or the like. The SDS management device 104 is configured to manage the storage pool 106. The SDS management device 104 (which may also be implemented as a software layer) may be configured to determine how and where data is stored in the storage pool 106. In one example, the SDS management device 104 includes software that effectively separates storage related tasks from the hardware itself.

The storage pool 106 includes multiple nodes (e.g., commodity hardware) that may be rack mounted. Some of the nodes in the storage pool 106 may be associated with a different SDS system or offline. The storage pool 106 may include multiple nodes. The SDS systems are each associated with some of the nodes in one example.

The SDS management device 104 may include a provisioning module 110. The provisioning module 110 is configured to monitor characteristics of SDS systems in a computing environment and provision and de-provision nodes based on the characteristics. For example, the decisions may be based on the values of the characteristics that are monitored over time. The provisioning module 110 is configured to automatically provision and/or de-provision nodes in one or multiple SDS systems. Alternatively, the provisioning module 110 may cooperate with provisioning modules of other SDS systems such that the nodes in the computing environment can be provisioned among all SDS systems. Alternatively, the provisioning module 110 may be specific to a specific SDS system.

In operation, data requests (e.g., reads, writes, deletes, copy, move, etc.) are received at the SDS management device 104. The data requests, depending on the configuration of the SDS system, may include local data requests and/or remote data requests (e.g., requests over the Internet). The SDS management device 104 then handles the data requests and accesses the storage pool 106 as appropriate. The data requests may be directed to a specific node 108 within the storage pool 106. Each node may include storage of some type. The nodes of an SDS system are not required to have the same type of storage. Thus, some nodes may provide SSD storage while other nodes may provide hard disk or magnetic based storage. This allows, in one example, an SDS system to provide tiered storage.

The SDS management device 104 may be configured to manage the nodes associated with the SDS systems. When multiple SDS systems are present, nodes can be provisioned or de-provisioned and placed offline when needed without manual intervention.

In one example, the provisioning module may communicate with multiple SDS systems or with the nodes of multiple SDS systems using an appropriate application programming interface (API). Using the API, the provisioning module or managing SDS system can monitor the characteristics of the nodes individually and/or collectively. In one example, decisions related to provisioning the SDS systems can be based on the values of specific nodes, certain groups of nodes, or all nodes collectively.

Figure 2:
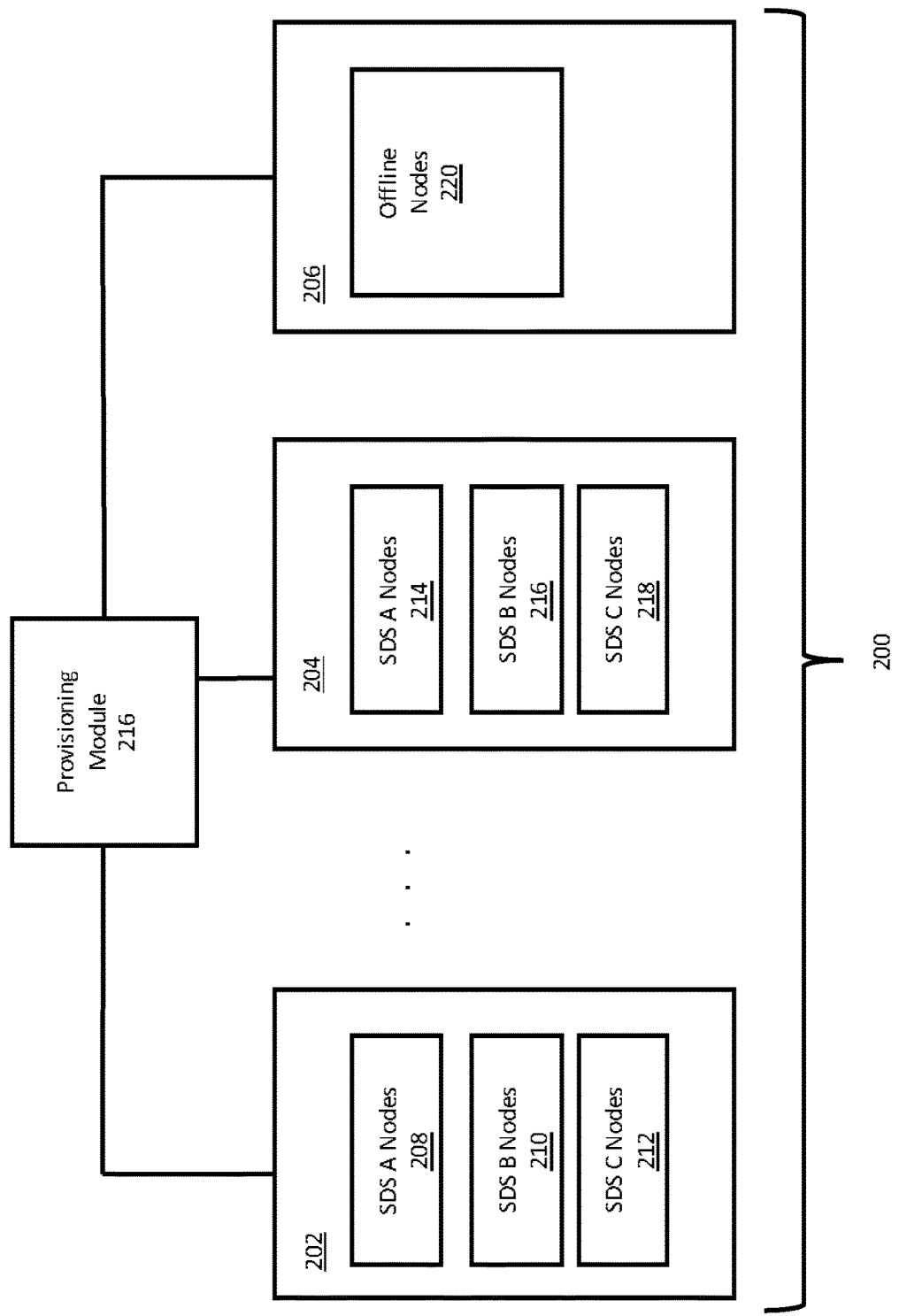
FIG. 2 illustrates nodes that are associated with multiple SDS systems and that are arranged on racks and that are configured to be automatically provisioned and de-provisioned.

FIG. 2 illustrates an example of a storage pool 200. The storage pool 200 may be part of a specific entity's network or may be included in a data center. The storage pool may be associated with multiple entities. The storage pool 200 is used in the context of SDS systems. Embodiments of the invention are discussed with respect to nodes that are mounted on racks, but embodiments of the invention extend to multiple racks and to nodes placed in multiple locations. The nodes of the storage pool and the racks may even be geographically dispersed.

FIG. 2 illustrates three racks 202, 204 and 206. In this example, the rack 202 hosts server nodes 208 associated with an SDS system A, server nodes 210 associated with an SDS system B, and server nodes 212 associated with an SDS system C. The rack 204 is associated with server nodes 214 associated with the SDS A, server nodes 216 associated with the SDS B, and server nodes 218 associated with the SDS C.

The rack 206 includes server nodes 220. In this example, the nodes 220 are not associated with any of the SDS systems and may not be provisioned. The nodes 220 may be offline in one example. As the SDS systems A, B and C operate, the management device or provisioning module (which may be embodied as a software layer) monitors characteristics of each SDS system. If storage or additional capacity is needed for the SDS system C, the provisioning module 216 may look for unused nodes on any of the racks 202, 204 and 206. Over time, each of the racks 202, 204, and 206 may include both active nodes that are associated with the SDS systems and nodes that are offline.

Figure 3:
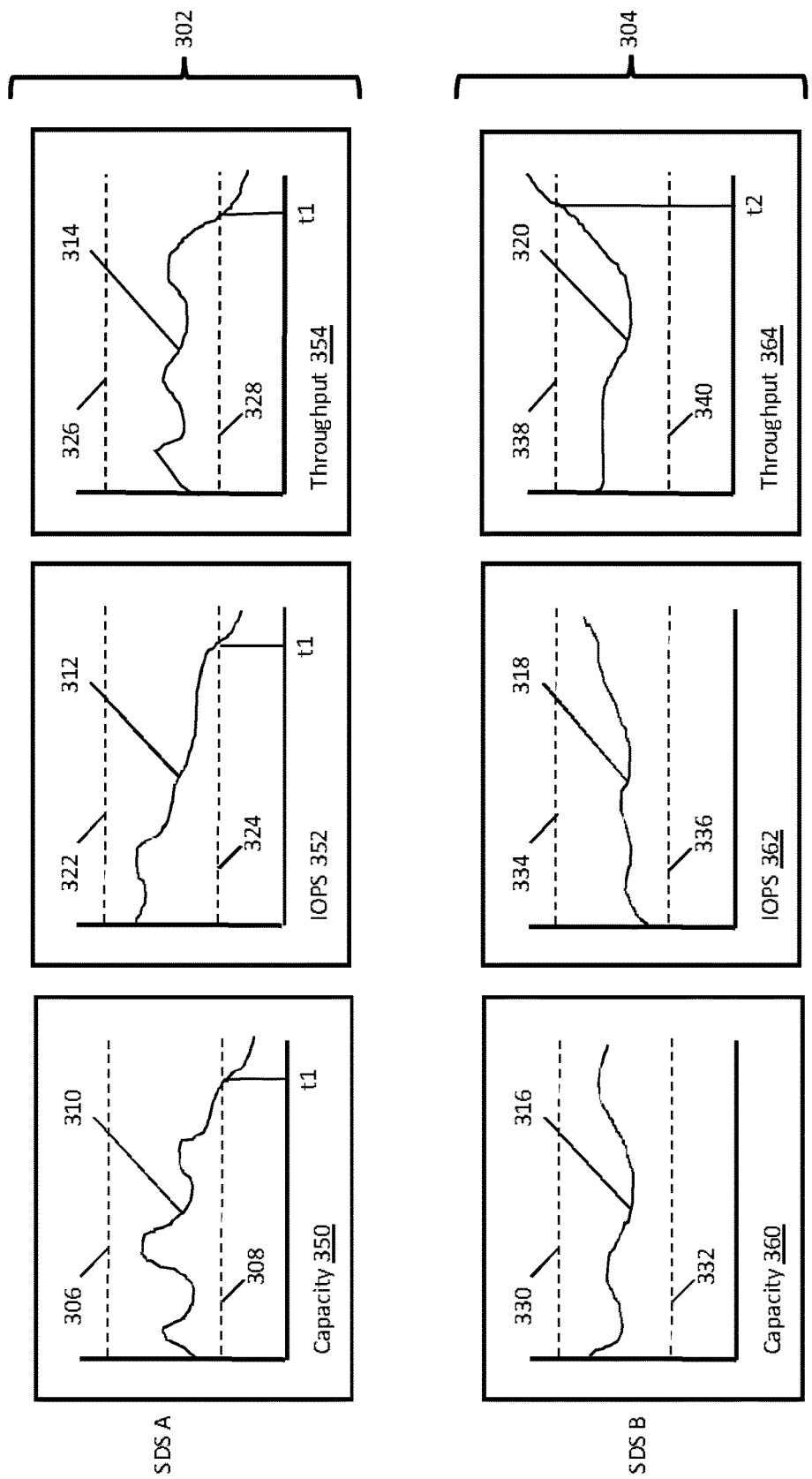
FIG. 3 illustrates an example of factors or characteristics related to provisioning and de-provisioning nodes in an SDS system.

The provisioning module 216 monitors certain characteristics of each of the SDS systems. With reference to FIGS. 2 and 3, the provisioning module 216 (or multiple provisioning modules) monitor characteristics of the SDS systems.

FIG. 3 illustrates graphs associated with the characteristics of the SDS systems A and B. FIG. 3 illustrates a capacity graph 350, an IOPS graph 352, and a throughput graph 354 associated with the SDS system A, but other performance or capacity metrics might be used. The provisioning module 216 may also monitor characteristics such as, but not limited to, cache capacity or utilization, processor utilization, or the like or any combination thereof.

FIG. 3 similarly illustrates a capacity graph 360, an IOPS graph 362 and a throughput graph 364 for the SDS system B. Other SDS systems in the computing environment associated with the storage pool 200 are associated with similar graphs. Thus, FIG. 3 graphically illustrates an example of tracking or monitoring the characteristics of the SDS systems in the computing environment.

The graphs 350 and 360 each track the capacity of the SDS systems A and B. More specifically, the lines 310 and 316 reflect the amount of capacity or storage actually used with respect to the total capacity being managed, respectively, by the SDS systems A and B. Each SDS system still includes unused storage.

More specifically, the capacity graph 350 is associated with an upper threshold 306 (e.g., some percentage of the total capacity) and a lower threshold 308 (some percentage of the total capacity). The x axis represents time and the capacity graph 350 illustrates that the capacity being used changes over time. Graph 350 illustrates that the capacity being used fluctuates between the upper threshold and the lower threshold over time. The change in capacity or storage used reflected by the line 310 may be due to writes, deletions, copies, or other storage accesses.

When the line 310 approaches the upper threshold 306, this provides the provisioning module 216 with an indication that the SDS system A may need additional storage. In one example, whenever any one characteristic reaches or passes its upper threshold, the provisioning module 216 adds capacity to the affected SDS system by provisioning one or more nodes. The lower threshold 308 indicates that there is ample storage or capacity available to the SDS system. The lower threshold 308 is used as an indicator to indicate that it may be possible to remove capacity from the SDS system.

For example, when the line 310 crosses the lower threshold 308, the provisioning module may de-provision at least one node and cause the node to go offline. However, the provisioning module 216 may not remove nodes from the SDS system until more than one characteristic is below the lower threshold. At time t1 or at some point after t1, the provisioning module 216 determines that all three characteristics are below their corresponding lower thresholds. In this example, one or more nodes (and thus capacity) are removed from the SDS system when this condition occurs.

Similarly, the graph 360 illustrates the capacity of the SDS system B in use over time. The actual capacity of the SDS system B in use is reflected by the line 316. The graph 360 also illustrates an upper threshold 330 and a lower threshold 332.

The number of IOPS are reflected by the graphs 352 and 362. As illustrated in the graphs 352 and 362, the lines 312 and 318 represent the actual IOPS with respect to time. IOPS can also be affected by storage access requests. In one example, it is possible for the IOPS to exceed the upper threshold 322 even when the capacity being used is within an acceptable range below the lower threshold 306. The large number of IOPS, however, may reflect a need for increased capacity. As a result, the provisioning module 216 may add storage when the IOPS exceeds the upper threshold 322.

The graph 362 similarly illustrates the relationship of the IOPS of the SDS system B with respect to an upper threshold 334 and a lower threshold 336.

The graphs 354 and 364 represent throughput of the SDS systems A and B, respectively, over time. The throughput of the SDS system A is associated with an upper threshold 326 and a lower threshold 328 while the throughput of the SDS system B is associated with an upper threshold 338 and a lower threshold 340. If the line 314 or 320 crosses the corresponding upper threshold, this may indicate that additional capacity should be added to the corresponding SDS system for the purposes of supporting additional throughput in the aggregate system in one example. Similarly, the line 314 or 320 crosses the corresponding lower threshold, this may indicate that capacity can be removed from the corresponding SDS system.

FIG. 3 further illustrates a situation in which capacity is added to an SDS systems and a situation in which capacity is removed from an SDS system. More specifically, at time t1 or at some time after time t1, the capacity, IOPS, and throughput of the system SDS A are all below the corresponding lower thresholds 308, 324, and 328. In this case, capacity or storage is removed from the SDS system A. This can be achieved by de-provisioning at least one node and placing the node in an offline state (where it can later be added by any of the SDS systems). The amount of storage of capacity removed can be predetermined. Alternatively, the storage can be removed in steps (e.g., one node at a time) until at least one of the characteristics is above its corresponding lower threshold.

At time t2, FIG. 3 illustrates that the throughput of the system SDS B is above its upper threshold 338. In this case, capacity is added. This may be achieved, for example, by provisioning a node such that it is included in the SDS system B.

More generally, capacity or storage is removed when all characteristics fall below their corresponding lower thresholds. Capacity is added when one of the characteristics exceeds its corresponding upper threshold. Other combinations can be considered. For example, capacity may be reduced or added when any two of the characteristics exceed the upper or lower thresholds.

In another example, one characteristic may be given higher priority than the other characteristics. Thus, capacity may be added when the capacity characteristic exceeds its upper threshold or when both the IOPS and throughput characteristic exceed their upper thresholds.

The upper and lower thresholds may be different for each graph and may differ from one SDS system to another. For example, the upper and lower thresholds 306 and 308 may be different from the upper and lower thresholds 330 and 332.

Additional characteristics, such as latency, processor utilization, memory utilization, cache utilization, can also be monitored and used in determining when to add or remove storage from an SDS system. The determination to add or remove nodes can be based on any combination of these characteristics. In some situations, it is prudent to rely on multiple characteristics before adding or removing nodes. This is because some data may have other considerations (e.g., archival requirements, legal requirements, etc.).

In one example, capacity is increased by adding at least one node to the SDS system when a single characteristic hits its upper threshold at least because of the potential impact on performance. When any one of these characteristics gets too high, performance suffers. As a result, capacity is added when a single characteristic hits its upper threshold.

At the same time, it may be possible to reduce capacity when a single characteristic hits its lower threshold. However, some data is associated with storage requirements that are unrelated to performance. For example, an entity may be required to store data for some period of time, for example 7 years. If this data is archive data, the IOPS graph and the throughput graph may both be below their threshold limits. The capacity threshold is still above the lower threshold during the retention period. As a result, no nodes are removed from the SDS system.

When the retention period terminates, the data is deleted and the capacity characteristic falls below its lower threshold. As a result, nodes are de-provisioned and placed in an unprovisioned pool. Nodes may be removed one by one, for example, until at least one of the thresholds exceeds its lower threshold.

In this example, the storage is automatically managed. Storage or capacity is increased when necessary by adding nodes and, at the same time, nodes are moved offline when possible, which advantageously conserves energy. The newly unprovisioned nodes can be provisioned when necessary by any of the SDS systems.

Embodiments of the invention can be used in situations where multiple SDS systems are operating and in situations where a single SDS system is operating.

Figure 4:
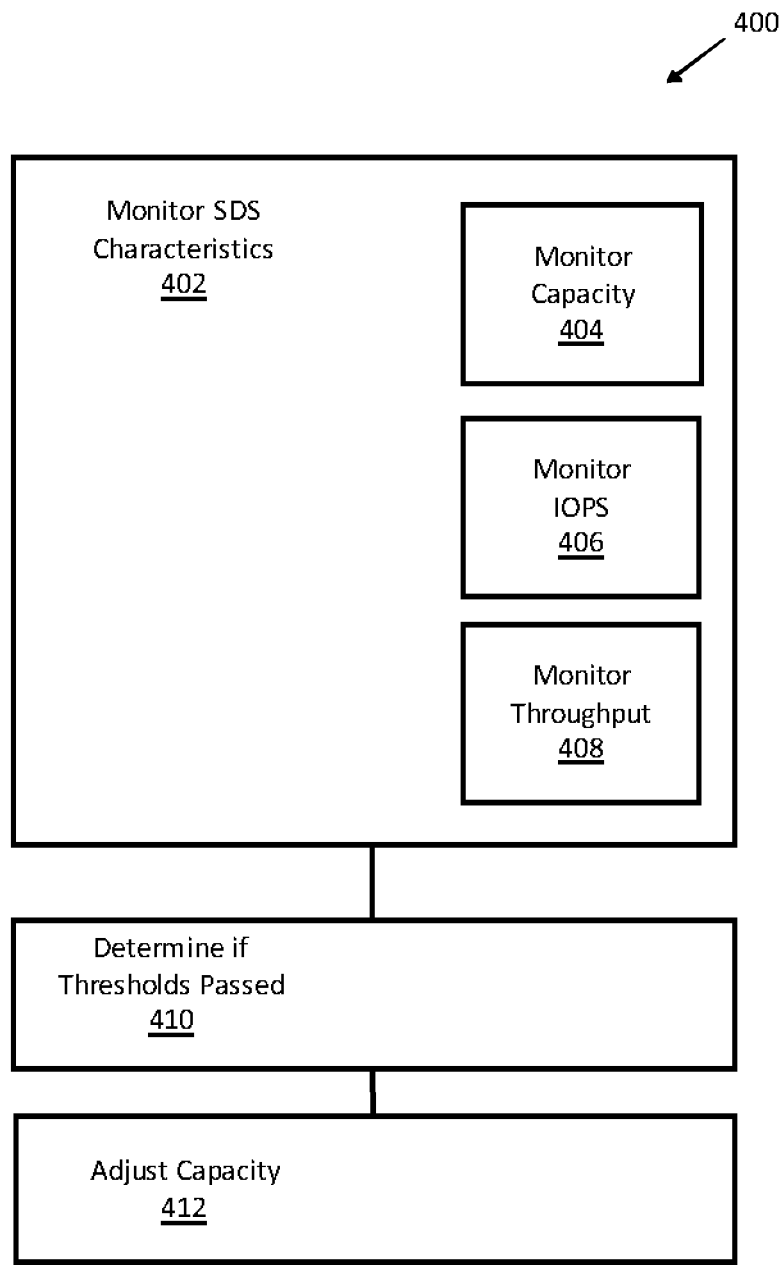
FIG. 4 is an example flow diagram for automatically provisioning and de-provisioning nodes in an SDS system.

FIG. 4 illustrates an example method 400 for automatically managing the capacity of an SDS system. The method begins by monitoring characteristics of at least one SDS system in box 402. The characteristics of the SDS system or systems can be performed continuously or periodically or by another schedule.

Monitoring the characteristics of the SDS systems may include monitoring the capacity of each SDS system in box 404, monitoring IOPS of each SDS system in box 406 and/or monitoring throughput of each SDS system in box 408. As previously suggested, other characteristics may also be monitored and considered when adding or removing storage. When the characteristics are monitored, a value is typically obtained. As illustrated in FIG. 3, the values of the characteristics change over time and may increase and decrease over time.

In box 410, the values of the characteristics are compared to thresholds or threshold levels. As previously discussed, each characteristic is associated with an upper threshold and a lower threshold. When all values of the characteristics are between the upper and lower thresholds, then the overall capacity of the SDS system may not require any adjustment. When one or more values are less than the lower threshold or greater than the upper threshold, then it may be necessary to adjust capacity in box 412.

As previously stated and by way of example and not limitation, the SDS system may adjust capacity in box 412 when any one of the characteristics being monitored is greater than the corresponding upper threshold level. However, capacity is decreased only when all characteristics are below the corresponding lower thresholds. In one example, all characteristics are below the corresponding lower thresholds at the same time.

In box 412, capacity is adjusted in accordance with the present characteristics of the SDS systems. When storage is added, by way of example and not limitation, storage may be added one node at a time. Each time a node is added, the characteristics are reevaluated to determine if additional storage is required. This process is repeated until all characteristics are below the corresponding upper thresholds.

When storage is removed, by way of example and not limitation, one node is removed at a time. After each removal, the characteristics may be reevaluated to determine whether the capacity should be reduced further. In another example, a certain amount or percentage of storage may be removed or added based on an evaluation of the characteristics of the SDS systems.

In addition, embodiments of the invention may be applied to tiered storage in the context of SDS storage systems. Characteristics can be determined for each tier of storage. As a consequence, nodes added to an SDS system may be selected based on the type of storage associated with the node. Because the nodes are not necessarily configured identically, some nodes may have high performance storage while other nodes have lower performance storage.

The nodes of the SDS systems discussed herein may be virtualized or containerized. Virtualized or containerized nodes can be migrated to other nodes in the computing environment.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing a storage of a software defined storage (SDS) system, the method comprising:
    monitoring characteristics of a plurality of storage nodes included in the SDS system, wherein each characteristic applies to the plurality of storage nodes collectively and the characteristics include at least one of a capacity value, and IPOS (Input Output operations per Second) value, and a throughput value;
determining whether any of the characteristics are greater than a corresponding upper threshold or lower than a corresponding lower threshold;
automatically adjusting the storage of the SDS system based on values of the characteristics, wherein adjusting the storage includes:
adding additional storage nodes to the plurality of storage nodes until the capacity value is lower than an upper capacity threshold, the IOPS value is lower than an upper IOPS threshold, and the throughput value is lower than an upper throughput threshold.

2. The method of claim 1, wherein the capacity value corresponds to storage of the storage nodes used by the at least one SDS system.

3. The method of claim 1, further comprising removing storage nodes until the capacity value is greater than a lower capacity threshold, the IOPS value is greater than a lower IOPS threshold, and the throughput value is greater than a lower throughput threshold.

4. The method of claim 1, further comprising determining whether the throughput value is greater than the upper throughput threshold or lower than a lower throughput threshold, determining whether the capacity value is greater than the upper capacity threshold or lower than a lower capacity value, and determining whether the IPOS value is greater than the upper IOPS threshold or lower than a lower IOPS threshold value.

5. The method of claim 1, further comprising monitoring the characteristics of multiple SDS systems.

6. The method of claim 5, further comprising determining whether any of the characteristics of the multiple SDS systems are greater than a corresponding upper threshold or lower than a corresponding lower threshold.

7. The method of claim 6, further comprising adjusting the storage associated with each of the multiple SDS systems based on which characteristics are greater than their corresponding upper threshold or lower than their corresponding lower threshold.

8. The method of claim 7, wherein when one of the characteristics is greater than its corresponding upper threshold, storage is added to the corresponding SDS system.

9. The method of claim 7, wherein when all of the characteristics are below their corresponding lower threshold, storage is removed from the corresponding SDS system.

10. A method for managing storage nodes included in multiple storage defined software (SDS) system, the method comprising:
for each SDS system:
comparing a capacity value with an upper capacity threshold and a lower capacity threshold;
comparing an IOPS (Input Output operations Per Second) value with an upper IOPS threshold and a lower IOPS threshold;
comparing a throughput value with an upper throughput threshold and a lower throughput threshold;
automatically adding at least one storage node to the SDS system when any of the capacity value, the IOPS value, and the throughput value are greater than, respectively, the upper capacity threshold, the upper IOPS value, and the upper throughput value; and
automatically removing at least one storage node from the SDS system when each of the capacity value, the IOPS value, and the throughput value are all lower than, respectively, the lower capacity threshold, the lower IOPS value, and the lower throughput value.

11. The method of claim 10, further comprising, for each SDS system:
comparing a latency value with an upper latency threshold and a lower latency threshold;
adding at least one storage node to the SDS system when any of the capacity value, the IOPS value, the throughput value and the latency value are greater than, respectively, the upper capacity threshold, the upper IOPS value, the upper throughput value, and the upper latency threshold; and
removing at least one storage node from the SDS system when at least three of the capacity value, the IOPS value, the throughput value, and the latency value are each lower than, respectively, the lower capacity threshold, the lower IOPS value, the lower throughput value, and the lower latency threshold.

12. The method of claim 10, wherein characteristics are re-evaluated each time a storage node is added to the SDS system, the characteristics including the capacity value, the IOPS value, and the throughput value.

13. The method of claim 12, wherein the characteristics are re-evaluated each time a storage node is removed from the SDS system.

14. The method of claim 12, wherein the storage includes tiers of storage and each tier of storage is associated with its own characteristics such that a particular tier of storage is added to or removed from the SDS system based on the characteristics of the particular tier.

15. The method of claim 10, further comprising placing nodes removed from the SDS system offline.

16. The method of claim 10, wherein the storage nodes of each SDS system are arranged in a cluster.

* * * * *